(12) United States Patent
Booth, Jr. et al.

(10) Patent No.: US 6,175,442 B1
(45) Date of Patent: Jan. 16, 2001

(54) ANTI-REFLECTION LAYER IN SPATIAL LIGHT MODULATORS

(75) Inventors: Lawrence A. Booth, Jr., Phoenix; Kannan Raj, Chandler, both of AZ (US)

(73) Assignee: Intel Corporation, Santa Clara, CA (US)

(*) Notice: Under 35 U.S.C. 154(b), the term of this patent shall be extended for 0 days.

(21) Appl. No.: 09/318,683

(22) Filed: May 25, 1999

(51) Int. Cl.[7] .................................................. G02C 26/00
(52) U.S. Cl. ............................ 359/290; 359/245; 359/237
(58) Field of Search ..................................... 359/245, 290, 359/885, 833, 834, 237, 248, 252, 253; 428/141, 156, 913

(56) References Cited

U.S. PATENT DOCUMENTS

| 5,142,385 | 8/1992 | Anderson et al. | 369/10 |
| 5,817,396 | * 10/1998 | Perlo et al. | 428/141 |

* cited by examiner

Primary Examiner—Hung Xuan Dang
(74) Attorney, Agent, or Firm—Trop, Pruner & Hu, P.C.

(57) ABSTRACT

A spatial light modulator includes a plurality of spaced pixel elements. This gives rise to the possibility of reflections of light through inter-pixel gaps. These reflections may be reduced, improving the contrast, in some embodiments of the present invention, by providing a substrate beneath the pixel elements with a moth-eye like array of protrusions formed thereon. These protrusions tend to ameliorate the effects of inter-pixel light by causing multiple reflections which tend to dissipate such light.

24 Claims, 1 Drawing Sheet

ANTI-REFLECTION LAYER IN SPATIAL LIGHT MODULATORS

BACKGROUND

This invention relates generally to spatial light modulators including those which use liquid crystal on silicon (LCOS), grating light valves and digital micro mirror devices (DMMD), as examples.

In spatial light modulators, light modulation is achieved by controlling the electro-optic modulation of individual pixel elements. An inter-pixel gap between the pixel elements is generally assumed to be non-reflective. Therefore the gap is assumed not to interfere with modulation mechanism of the individual pixel elements.

However, the optical properties of the inter-pixel gap determine the optical coupling to the substrate and the contrast of the spatial light modulator. For example, the pixel elements may in some cases be formed of a plurality of pixel plates which are spaced from one another. It is generally believed that the layer under these pixel plates is not significantly reflective. This layer under the pixel plates, which in some designs may be the metal layer, may include an anti-reflective coating of titanium nitride (TiN) and a metallic absorbing layer. See, E. G. Colgan and M. Uda, On-Chip Metallization Layer for Reflective Light Valves, IBM Journal of Research and Development, 339–335, Vol. 42, May/July 1998. This report states that both the metal and the anti-reflective layers are made sufficiently thick that they are essentially optically opaque. Light incident between the pixel plates requires multiple reflections between the top of the anti-reflective layer and the bottom of the material layer to reach the silicon substrate. However, the report states that the titanium nitrate anti-reflective layer actually has a reflectivity of about twenty percent for blue light and sixty-five percent for red light.

Reflectance from light which passes through the inter-pixel gap affects contrast. Contrast is reduced because a dark pixel is not completely dark. The extraneous light is reflected from all four sides of the pixel gap. The white-dark transition and dark-dark transitions in the image have reduced visibility.

Thus, there is a continuing need for better ways to reduce the reflectance from light which passes between pixel elements.

SUMMARY

In accordance with one aspect, a spatial light modulator includes a plurality of spaced pixel elements. A substrate spanning the pixel elements has an array of moth-eye like elements formed thereon.

DETAILED DESCRIPTION

A spatial light modulator 10, which may be a liquid crystal on silicon (LCOS) spatial light modulator, a grating light valve or a digital micro mirror device as examples, includes a plurality of pixel elements 12 with intervening inter-pixel gaps 14. The pixel elements may be, for example, pixel plates in an LCOS embodiment. Light reflected from the surface underneath the pixel elements 12, passing through the inter-pixel gaps 14, will reduce the contrast of the image formed by the spatial light modulator 10.

Figure 1:
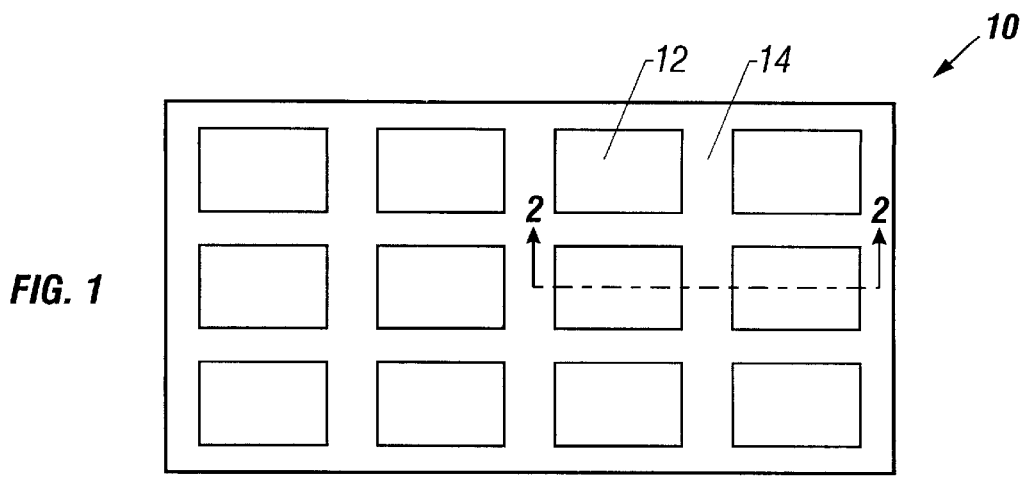
FIG. 1 is a top plan view of one embodiment of the spatial light modulator in accordance with one embodiment of the present invention.
Figure 2:
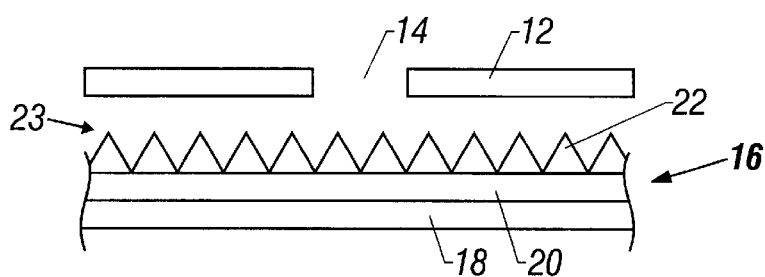
FIG. 2 is an enlarged cross-sectional view taken generally along the line 2—2 in FIG. 1.

Referring to FIG. 2, a layer 16 below the pixel elements 12 may be formed of a composite of three layers. The lowest layer 18 may be formed of a light blocking metal layer as is conventional. The layer 18 is covered by an anti-reflective layer such as titanium nitride as is conventional. Atop the layers 18 and 20 is an antireflective layer 22 formed of a plurality of moth-eye like elements which absorb light and reduce light reflection. Thus, light in the inter-pixel gap is absorbed by the combination of the three elements 22, 20 and 18. This may improve the contrast of the display.

Figure 3:
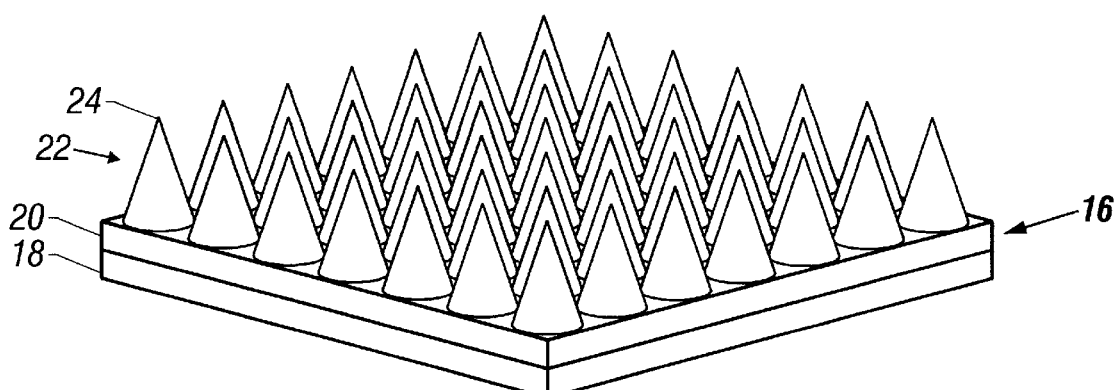
FIG. 3 is a perspective view of a portion of the layer below the pixel elements shown in FIG. 2.

In some embodiments, the pixel elements, which may be pixel plates, may be formed directly over the layer 16 or an intervening interlayer dielectric may be provided as indicated at 23. As shown in FIG. 3, the moth-eye like elements 22 may be formed on planarized surfaces, for example from a polymeric material, using techniques such as holographic lithography. See U.S. Pat. No. 5,142,385 assigned to Massachusetts Institute of Technology and N. P. Economou et al., "A Simple Technique for Modifying the Profile of Resist Exposed by Holographic Lithography," J. Vac. Sci. Tech. 19, 1234 (1981).

Interference lithography, used for example by Holographic Lithography Systems, Inc. of Bedford, Mass., is a maskless holographic technique which allows the patterning, by interference, of feature sizes as small as 90 nanometers over large areas. Holographic lithography involves a periodic or quasi periodic pattern exposed in a photosensitive film by overlapping two beams from a laser or other coherent source.

In one particular implementation of holographic lithography, termed "achromatic holographic lithography," gratings are used to split and recombine the beams (see E. Anderson, K. Komatsu and H. I. Smith, "Achromatic Holographic Lithography in the Deep UV," J. Vac. Sci, Tech. B6, 216 (1988)). As a result, the source need not have a high degree of temporal coherence (i.e., narrow bandwidth) or spatial coherence commonly seen in laser sources. The minimum period, p, (i.e., center-to-center distance between adjacent lines) obtainable in holographic lithography is given by $p = \lambda/2 \sin \theta$ where $\lambda$ is the wavelength of the exposed radiation and $\theta$ is half the angle between the intersecting beams. This angle may be as large as 62 degrees, in which case $p=0.57\lambda$.

If two beams from a single coherent source, such as a laser overlap, and if environmental vibrations are sufficiently low that the beams do not move relative to one another by more than about p/2, a recognizable diffraction grating may be recorded in a photographic resist film. In the region of overlap of the two beams there is an optical standing wave whose spatial period is given by the above equation. The standing wave includes sinusoidally alternating dark and light fringes (i.e., regions of high and low irradiance). The interference pattern is recorded in the photosensitive film or resist. The recorded pattern may then be used to form a pattern in an underlying material using well known photolithography techniques.

Using this technique, microscopic, moth-eye like surface relief structures may be formed, as shown in FIG. 3, with feature sizes on the order of 100 nanometers. These structures have low reflectance over large wavelength bands and angular acceptance ranges. Patterning the top layer 22 of light absorbing material traps the light and minimizes the reflection from the gaps between pixels, thereby improving contrast.

Figure 4:
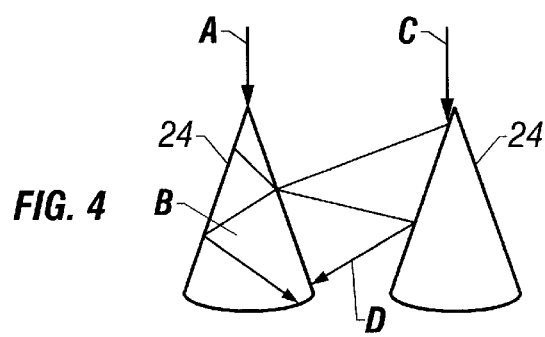
FIG. 4 is an enlarged view of a pair of adjacent moth-eye like elements used in the embodiment shown in FIG. 3.

The shape of the elements 24, shown in FIG. 3, may reduce light reflection in two ways in some embodiments of the present invention. Referring to FIG. 4, with light transmissive elements 24, incident light A may be repeatedly, internally reflected within the element 24 as indicated at B.

In addition, incident light C between two adjacent elements 24 may be subject to multiple, labyrinthine reflections as indicated by the arrows D, also reducing the light available to adversely affect contrast. A pattern of elements 24 may be created which sufficiently absorbs incident light by causing multiple reflections between closely adjacent elements 24.

The elements 24 shown in FIGS. 3 and 4, are of a conical shape; however, other shapes may be used as well. Pillar shaped elements, for example with blunt outer ends, may also be used.

In some embodiments, the elements 24 may be formed of a metallic material. This may be advantageous in facilitating the formation of the pixel elements 12 which may also be formed of metal and may require temperature stability in the underlying layers. In such cases, the internal reflections of the elements 24 may not be a factor.

For example, the elements 24 may be formed by recording the interference hologram in a master made of nickel. A surface relief pattern is formed by the electrolytic deposition of nickel on a photographic surface relief master. The master may then be used to emboss the holographic pattern into metal foil such as aluminum foil. See U.S. Pat. No. 4,773, 718.

In still another embodiment, the moth-eye like elements may be formed in a layer generally in the plane of the pixel elements. In other words, the elements may be formed in a layer formed in what would otherwise have been the pixel gaps. This may be done by building back the channels in the gaps between elements with a planarization process that also results in forming the moth-eye like elements between pixel elements.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A spatial light modulator comprising:

a plurality of spaced pixel modulator elements; and a substrate spanning said pixel modulator elements, said substrate having an array of moth-eye elements formed thereon.

2. The modulator of claim 1 wherein said modulator is a liquid crystal on silicon modulator and said pixel modulator elements are formed as pixel plates.

3. The modulator of claim 2 wherein said substrate is formed of a metal material.

4. The modulator of claim 3 wherein said moth-eye like elements are formed in a metal foil using an embossing technique.

5. The modulator of claim 1 wherein said substrate also includes a anti-reflective layer underneath said moth-eye elements.

6. The modulator of claim 5 wherein said antireflective layer is titanium nitride.

7. The modulator of claim 6 wherein said substrate also includes a light blocking metal layer.

8. The modulator of claim 1 wherein said substrate is below the pixel modulator elements.

9. A spatial light modulator comprising:

a plurality of spaced pixel modulator elements and inter-pixel gaps; and a surface adapted to absorb light passing between said pixel modulator elements, said surface including an array of microscopically sized protrusions extending upwardly from said surface.

10. The modulator of claim 9 wherein said modulator is a liquid crystal on silicon modulator and said pixel modulator elements are formed as pixel plates.

11. The modulator of claim 10 wherein said surface is formed of a metal material.

12. The modulator of claim 11 wherein said metal is an embossed metal foil.

13. The modulator of claim 9 wherein said protrusions are on the order of 100 nanometers.

14. The modulator of claim 9 wherein said protrusions are formed by holographic lithography.

15. The modulator of claim 9 wherein said surface is beneath said pixel modulator elements and said protrusions extend upwardly toward said pixel elements.

16. The modulator of claim 9 wherein said protrusions are conical.

17. The modulator of claim 9 wherein said protrusions are light transmissive.

18. A method of forming a spatial light modulator comprising:

forming an anti-reflective surface having a pattern of moth-eye protrusions formed thereon; and forming metal pixel modulator elements with gaps such that light directed toward said gaps falls on said surface.

19. The method of claim 18 including forming a layer of titanium nitride and forming said anti-reflective surface over said titanium nitride layer.

20. The method of claim 19 including forming an intermediate layer between said pixel modulator elements and said anti-reflective surface.

21. The method of claim 20 including packing said protrusions closely enough to cause light to be reflected repeatedly between said protrusions.

22. The method of claim 18 including forming said surface of a material that will remain stable when said pixel modulator elements are formed.

23. The method of claim 18 wherein forming said surfaces includes embossing a holographic pattern into a metal foil.

24. The method of claim 18 including forming said surface over said pixel modulator elements.

* * * * *

UNITED STATES PATENT AND TRADEMARK OFFICE
CERTIFICATE OF CORRECTION

PATENT NO. : 6,175,442
DATED : January 16, 2001
INVENTOR(S) : Lawrence A. Booth, Jr. and Kannan Raj It is certified that error appears in the above-identified patent and that said Letters Patent are hereby corrected as shown below:

In column 4, line 7, "antireflective" should be --anti-reflective--.

Signed and Sealed this

Fifteenth Day of May, 2001

Attest:

NICHOLAS P. GODICI

Attesting Officer   Acting Director of the United States Patent and Trademark Office